(12) United States Patent
Kim

(10) Patent No.: US 8,504,231 B2
(45) Date of Patent: Aug. 6, 2013

(54) SYSTEM AND METHOD FOR CONTROLLING TRAVEL OF HYBRID ELECTRIC VEHICLE IN AN EMERGENCY

(75) Inventor: Sang Joon Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 13/297,562

(22) Filed: Nov. 16, 2011

(65) Prior Publication Data

US 2012/0303192 A1   Nov. 29, 2012

(30) Foreign Application Priority Data

May 24, 2011   (KR) .................. 10-2011-0048785

(51) Int. Cl.
| | |
|---|---|
| B60L 9/00 | (2006.01) |
| B60L 11/00 | (2006.01) |
| G05D 1/00 | (2006.01) |
| G05D 3/00 | (2006.01) |
| G06F 7/00 | (2006.01) |
| G06F 17/00 | (2006.01) |

(52) U.S. Cl.
USPC ............................................. 701/22; 701/36

(58) Field of Classification Search
USPC ......... 701/22, 70, 42, 33, 10; 320/15; 318/59, 318/25; 304/14; 303/3
See application file for complete search history.

(56) References Cited

U.S. PATENT DOCUMENTS

| | | | | |
|---|---|---|---|---|
| 5,255,208 A | * | 10/1993 | Thakore et al. | 702/185 |
| 7,212,913 B1 | * | 5/2007 | Shimada et al. | 701/114 |
| 8,042,887 B2 | * | 10/2011 | Yamamoto et al. | 303/155 |
| 8,103,394 B2 | * | 1/2012 | Hashimoto | 701/22 |
| 8,143,835 B2 | * | 3/2012 | Taguchi et al. | 318/599 |
| 2008/0234897 A1 | * | 9/2008 | Tsuchida | 701/42 |
| 2009/0033294 A1 | * | 2/2009 | Odajima et al. | 320/166 |
| 2010/0085019 A1 | * | 4/2010 | Masuda | 320/152 |
| 2010/0235043 A1 | * | 9/2010 | Seta et al. | 701/34 |
| 2011/0025119 A1 | * | 2/2011 | Nishino et al. | 303/3 |
| 2011/0077831 A1 | * | 3/2011 | Nishino et al. | 701/70 |
| 2011/0095603 A1 | * | 4/2011 | Lee et al. | 307/10.1 |
| 2011/0166736 A1 | * | 7/2011 | Kitanaka | 701/22 |
| 2011/0316329 A1 | * | 12/2011 | Nishino et al. | 303/14 |
| 2012/0035824 A1 | * | 2/2012 | Sy et al. | 701/70 |
| 2012/0123625 A1 | * | 5/2012 | Ueo et al. | 701/22 |
| 2012/0150406 A1 | * | 6/2012 | Tomura et al. | 701/70 |
| 2012/0173066 A1 | * | 7/2012 | Yamada et al. | 701/22 |

* cited by examiner

*Primary Examiner* — Thomas Black
*Assistant Examiner* — Robert Payne
(74) *Attorney, Agent, or Firm* — Edwards Wildman Palmer LLP; Peter F. Corless

(57) ABSTRACT

Disclosed herein is a method of controlling the travel of a hybrid electric vehicle in an emergency. It is determined whether an abnormality has occurred in a low voltage Direct Current-Direct Current (DC-DC) converter. When it is determined that an abnormality has occurred in the low voltage DC-DC converter, it is determined whether the voltage of a low voltage battery has deviated from the operational voltage range of a braking device. When the voltage of the low voltage battery has deviated from the operational voltage range of the braking device, a restricted vehicle speed is set to take into account mechanical braking power. A maximum torque used to restrict the torque of a driving motor is set based on the set restricted vehicle speed.

8 Claims, 3 Drawing Sheets

SYSTEM AND METHOD FOR CONTROLLING TRAVEL OF HYBRID ELECTRIC VEHICLE IN AN EMERGENCY

CROSS-REFERENCE TO RELATED APPLICATIONS

This application claims under 35 U.S.C. §119(a) priority to Korean Application No. 10-2011-0048785, filed on May 24, 2011, the disclosure of which is incorporated herein by reference in its entirety.

BACKGROUND OF THE INVENTION

1. Field of the Invention

The present invention relates generally to a system and method for controlling the travel of a hybrid electric vehicle in an emergency, and, more particularly, to a system and method for controlling the travel of a hybrid electric vehicle in an emergency, which restricts the vehicle speed and maximum torque of a vehicle when an abnormality occurs in a low voltage Direct Current-to-Direct Current (DC-DC) converter and the voltage of a low voltage battery deviates from the operational voltage range of a braking device.

2. Description of the Related Art

Generally, a Hybrid Electric Vehicle (HEV) uses a high voltage of 110V or greater when the driving force of a motor during sudden acceleration is applied and charges when the vehicle is braking. When viewed on the basis of electric power efficiency or new construction of the electric/electronic system of such a hybrid electric vehicle, it is advantageous to increase the power of the system based on high voltage power when high voltage power exists. However, there is a risk of electric shock exists and requires a large amount of time and effort and unnecessary development work to change the existing systems in place.

One such design has tried to address this problem by using two types of batteries at the same time, that is, a main battery for high voltage which uses a main voltage of 250V or more and a subsidiary battery for a general vehicle which uses a voltage of 12V. The main battery for high voltage supplies a specific amount of power to a driving system, air conditioner, and heater in the hybrid electric vehicle. The subsidiary battery which supplies a voltage of 12V supplies power to various types of electric/electronic assemblies as in the system of a general commercial vehicle. In particular, such a hybrid electric vehicle uses a subsidiary battery having a voltage of 12V. When the subsidiary's power battery is insufficient, the subsidiary battery is charged using a Low voltage DC-DC Converter (LDC) for converting high voltage into low voltage.

However, when problems occur in a low voltage DC-DC converter or errors occur in communications with the low voltage DC-DC converter, the voltage of a subsidiary battery continuously drops, so that electric/electronic assemblies may not normally operate or malfunctions may occur. In particular, when power is not smoothly supplied to a braking device, the braking performance of a vehicle is seriously deteriorated, thereby increasing the risk of an accident.

SUMMARY OF THE INVENTION

Accordingly, the present invention has been made keeping in mind the above problems occurring in the prior art, and an object of the present invention is to provide a system and method for controlling the travel of a hybrid electric vehicle in an emergency, which can secure stable braking power even when an abnormality occurs in a low voltage DC-DC converter and the voltage of a low voltage battery deviates from the operational voltage range of a braking device.

In order to accomplish the above object, the present invention provides a method of controlling the travel of a hybrid electric vehicle in an emergency, including: determining whether an abnormality has occurred in a low voltage Direct Current-Direct Current (DC-DC) converter; when it is determined that an abnormality has occurred in the low voltage DC-DC converter, determining whether the voltage of a low voltage battery has deviated from the operational voltage range of a braking device; when the voltage of the low voltage battery has deviated from the operational voltage range of the braking device, setting a restricted vehicle speed taking into account mechanical braking power; and setting a maximum torque used to restrict the torque of a driving motor based on the set restricted vehicle speed.

Preferably, the present invention further includes controlling torque such that the torque of the driving motor linearly decreases from the maximum torque to zero torque in order to enable the traveling speed of a vehicle to reach the restricted vehicle speed. Additionally, the determining whether an abnormality has occurred in the low voltage DC-DC converter includes determining that an abnormality has occurred in the low voltage DC-DC converter when a problem has occurred in the low voltage DC-DC converter or a response signal has not been received from the low voltage DC-DC converter. For example, the restricted vehicle speed may be restricted to a range of 10 to 30 Km/h.

Meanwhile, a system for controlling the travel of a hybrid electric vehicle in an emergency according to the present invention, includes a low voltage DC-DC converter for converting high voltage of a high voltage battery into low voltage, and supplying the low voltage to a low voltage battery; a braking device for receiving power from the low voltage battery and then applying a braking signal to a driving motor or supplying mechanical braking power using braking force; and a vehicle controller for, when an abnormality has occurred in the low voltage DC-DC converter and voltage of the low voltage battery has deviated from the operational voltage range of the braking device, setting restricted vehicle speed in such a way as to take the mechanical braking power into consideration, and setting maximum torque of the driving motor.

Preferably, the vehicle controller determines that an abnormality has occurred in the low voltage DC-DC converter when a fault signal generated due to trouble is received from the low voltage DC-DC converter or a response signal has not been received from the low voltage DC-DC converter. Additionally, the vehicle controller controls torque such that the torque of the driving motor linearly decreases from the maximum torque to zero torque in order to enable traveling speed of a vehicle to reach the restricted vehicle speed.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
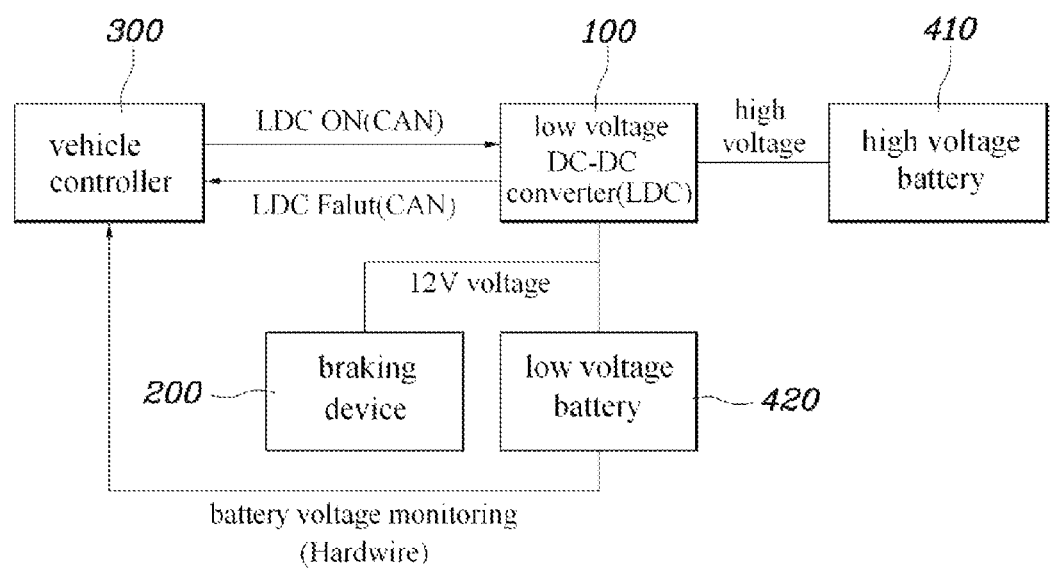
FIG. 1 is a diagram illustrating a system for controlling the travel of a hybrid electric vehicle in an emergency according to an exemplary embodiment of the present invention.

Reference now should be made to the drawings, in which the same reference numerals are used throughout the different drawings to designate the same or similar components. Further, it should be noted that, in the following description of the present invention, when it is determined that the detailed descriptions of well-known configurations or functions related to the present invention would obscure the gist of the present invention, such descriptions are omitted.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles. Embodiments of the present invention will be described in detail with reference to the attached drawings.

As shown in FIG. 1, when an abnormality occurs in a low voltage DC-DC converter 100 and the voltage of a low voltage battery 420 deviates from an operational voltage range of a braking device 200, a system for controlling the travel of a hybrid electric vehicle in an emergency according to the present invention sets a maximum torque such that the traveling speed of a vehicle can be restricted to predetermined speed. For this purpose, the present invention includes a low voltage DC-DC converter 100 for supplying low voltage to the low voltage battery 420, a braking device 200 for supplying braking power to a traveling vehicle, and a vehicle controller 300 for setting the restricted vehicle speed of the vehicle when an abnormality occurs in the low voltage DC-DC converter 100. In detail, the low voltage DC-DC converter 100 converts high voltage output from the high voltage battery 410 into low voltage output, and charges the subsidiary battery with the low voltage obtained through the conversion in order to drive components such as electric/electronic components which use the low voltage of a subsidiary battery, for example, 12V, or the braking device 200.

Such a low voltage DC-DC converter 100 is switched on/off in response to a control signal from a vehicle controller 300 via Controller Area Network (CAN) communication. When problems occur, the low voltage DC-DC converter 100 transmits a fault signal to the vehicle controller 300. The braking device 200 receives power from the low voltage battery 420 and applies a braking signal to a driving motor (not shown) in order to implement regenerative braking. Here, the driving motor may function as a power generator for supplementing power when sudden acceleration is performed by a hybrid electric vehicle, and regenerating energy and charging the high voltage battery 410 when braking is performed.

In particular, when power is not supplied from the low voltage battery 420, the braking device 200 according to the present embodiment enables braking power to be generated using mechanical braking force. Here, as the mechanical braking force, hydraulic braking force may be used. However, when the vehicle is moving at higher speeds or when braking pressure varies depending on application by a driver, deviations in braking distance may occur, thereby affecting safety. In exemplary embodiment of the present invention, when power is not supplied from the low voltage battery 420 to the braking device 200, the cause thereof is assumed that an abnormality has occurred in the low voltage DC-DC converter 100 or that the voltage of the low voltage battery 420 has deviated from the operational voltage range of the braking device 200. Thereafter, in order to eliminate the cause of such problem, the present invention sets a traveling speed and a maximum torque of a vehicle to be restricted within a predetermined range. Therefore, even though power is not supplied from the low voltage battery 420 to the braking device 200 and the performance of the braking device 200 is lowered, the safety of a driver can be guaranteed when the vehicle is being braked.

When power is not supplied from the low voltage battery 420 to the braking device 200, the cause thereof is determined using the vehicle controller 300. First, when an abnormality occurs in the low voltage DC-DC converter 100 and the voltage of the low voltage battery 420 deviates from the operational voltage range of the braking device 200, the vehicle controller 300 determines that power is not being smoothly supplied from the low voltage battery 420 to the braking device 200. Here, when a fault signal generated due to trouble is received from the low voltage DC-DC converter 100 or a response signal is not received from the low voltage DC-DC converter 100, the vehicle controller 300 determines that an abnormality has occurred in the low voltage DC-DC converter 100. When it is determined that power is not being smoothly supplied from the low voltage battery 420 to the braking device 200, the vehicle controller 300 sets the restricted vehicle speed of a vehicle in such a way as to take the mechanical breaking power of the braking device 200 into consideration, and restricts the torque of the driving motor in such a way as to set the maximum torque based on the set restricted vehicle speed.

First Embodiment

With regard to a detailed embodiment of restricted vehicle speed and maximum torque, the following Table 1 may be obtained. In Table 1, restricted vehicle speed and maximum torque are set in such a way as to take mechanical braking power into consideration first.

TABLE 1

| | Vehicle Speed (km/h) | | | | | | |
|---|---|---|---|---|---|---|---|
| | 0 | 5 | 10 | 15 | 20 | 25 | 30 |
| Torque (Nm) | 85 | 85 | 85 | 30 | 0 | 0 | 0 |

In the present embodiment, the restricted vehicle speed of a vehicle is set to 20 km/h to account for a range in which braking can be realized using the mechanical braking force of the braking device 200. Here, it is preferable that the restricted vehicle speed be lowered to less than 20 km/h for a medium or large-sized vehicle that has a large amount of inertia and that the restricted vehicle speed be increased to greater than 20 km/h for a small-sized vehicle that has a small amount of inertia.

Torque may be variably changed based on the restricted vehicle speed. When the restricted vehicle speed is set to 20 km/h as in the present embodiment, the torque should be gradually reduced before 20 km/h and the torque should be output to ONm when the speed is equal to or greater than 20 km/h so that the vehicle speed does not exceed the restricted vehicle speed of 20 km/h.

Figure 2:
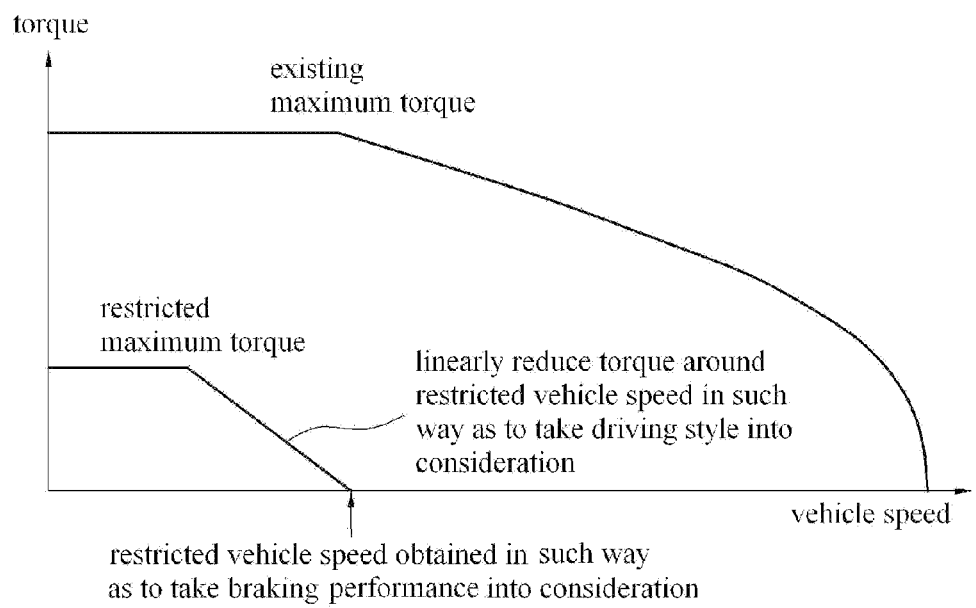
FIG. 2 is a graph illustrating the relationship between vehicle speed and maximum torque in the system for controlling the travel of a hybrid electric vehicle in an emergency according to an exemplary embodiment of the present invention.
Figure 3:
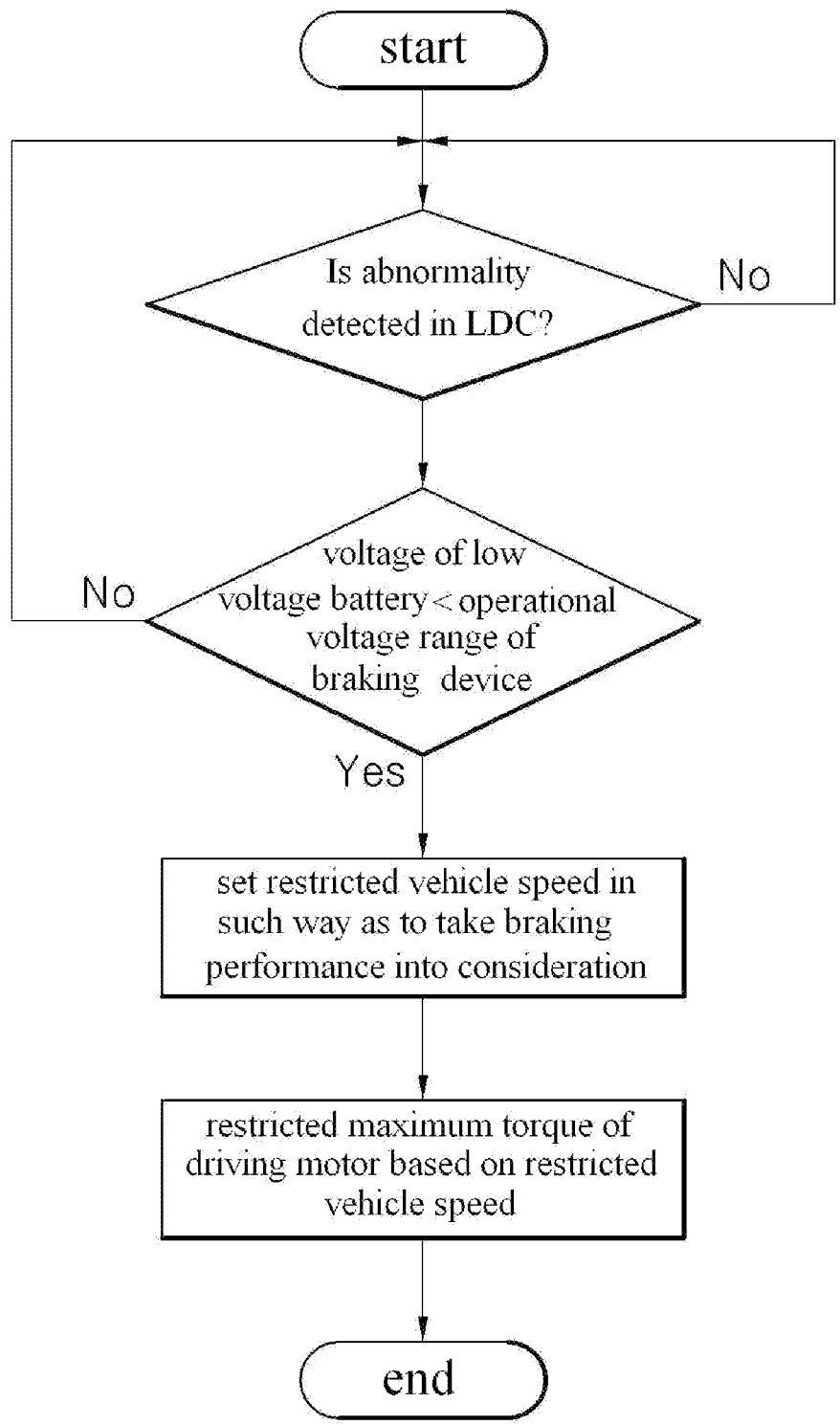
FIG. 3 is a flowchart illustrating a method of controlling the travel of a hybrid electric vehicle in an emergency according to an exemplary embodiment of the present invention.

In particular, as shown in FIG. 2, the vehicle controller 300 controls torque such that the torque of a driving motor linearly decreases from the maximum torque to zero torque in order to enable the traveling speed of a vehicle to reach the restricted vehicle speed. This control is the result of taking the driving style of a driver into consideration, thereby linearly reducing torque around the restricted vehicle speed.

A method of controlling the travel of a hybrid electric vehicle in an emergency according to the present invention will be described below. First, whether an abnormality has occurred in the low voltage DC-DC converter 100 is determined. Here, a reference used to determine whether an abnormality has occurred in the low voltage DC-DC converter 100 corresponds to when a problem has occurred in the low voltage DC-DC converter 100 or a response signal is not received from the low voltage DC-DC converter 100.

When it is determined that an abnormality has occurred in the low voltage DC-DC converter 100, it is determined whether the voltage of the low voltage battery 420 deviates from the operational voltage range of the braking device 200. In the present embodiment, a voltage range in which the braking device 200 can be operated is estimated to 12V or higher. When the operational voltage range of the braking device 200 is less than 12V of the low voltage battery 420, it is determined that the voltage of the low voltage battery 420 has deviated from the operational voltage range of the braking device 200.

When the voltage of the low voltage battery 420 deviates from the operational voltage range of the braking device 200, the restricted vehicle speed is set to account for mechanical braking power, and the maximum torque is set to restrict the torque of the driving motor based on the set restricted vehicle speed. Here, the restricted vehicle speed is set so as to fall in the range of 10 to 30 Km/h and more preferably the restricted vehicle speed is set to 20 Km/h. Thereafter, torque is controlled such that the torque of the driving motor linearly decreases from maximum torque to zero torque. As described above, control is performed such that torque around the restricted vehicle speed linearly decreases, so that the driving style of a driver can be taken into consideration.

As described above, when an abnormality occurs in a low voltage DC-DC converter, the maximum traveling speed of a vehicle is restricted to predetermined speed or less such that the mechanical braking power of the braking device can be effectively implemented. Thus, the present invention is efficiently and effectively able to guarantee the safety of a driver when a brake is applied in a vehicle and securing a safe braking distance with a small amount of power.

According to the present invention, the following advantages can be realized:

First, when an abnormality occurs in a low voltage DC-DC converter, the deterioration in the performance of a braking device is prevented, so that the present invention is able to guarantee the safety of a driver when a brake is applied to a vehicle. Second, when the mechanical braking power of a braking device is used, the maximum traveling speed of a vehicle is restricted to predetermined speed or less, so that the present invention has an advantage of securing a braking distance with even a small amount of power.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of controlling travel of a hybrid electric vehicle in an emergency, comprising:
    determining, by a controller, whether an abnormality has occurred in a low voltage Direct Current-to-Direct Current (DC-DC) converter;
    in response to determining that an abnormality has occurred in the low voltage DC-DC converter, determining, by the controller, whether voltage of a low voltage battery has deviated from an operational voltage range of a braking device;
    in response to determining that the voltage of the low voltage battery has deviated from the operational voltage range of the braking device, setting, by the controller, a restricted vehicle speed which takes into account mechanical braking power; and
    setting a maximum torque used to restrict a torque of a driving motor based on the set restricted vehicle speed.

2. The method as set forth in claim 1, further comprising controlling torque wherein a torque of the driving motor linearly decreases from the maximum torque to zero torque in order to enable traveling speed of a vehicle to reach the restricted vehicle speed.

3. The method as set forth in claim 1, wherein the determining whether an abnormality has occurred in the low voltage DC-DC converter comprises determining that an abnormality has occurred in the low voltage DC-DC converter when a problem has occurred in the low voltage DC-DC converter or a response signal has not been received from the low voltage DC-DC converter.

4. The method as set forth in claim 1, wherein the restricted vehicle speed falls in a range of 10 to 30 Km/h.

5. The method as set forth in claim 1, wherein the restricted vehicle speed is 20 Km/h.

6. A system for controlling travel of a hybrid electric vehicle in an emergency, comprising:
    a low voltage DC-DC converter configured to convert high voltage of a high voltage battery into low voltage, and supply the low voltage to a low voltage battery;
    a braking device configured to receive power from the low voltage battery and then apply a braking signal to a driving motor or supply mechanical braking power using braking force; and
    a vehicle controller configured to, when an abnormality has occurred in the low voltage DC-DC converter and voltage of the low voltage battery has deviated from an operational voltage range of the braking device, set a restricted vehicle speed which accounts for a mechanical braking power, and set a maximum torque of the driving motor.

7. The system as set forth in claim 6, wherein the vehicle controller is configured to determine that an abnormality has occurred in the low voltage DC-DC converter when a fault signal generated due to a problem is received from the low voltage DC-DC converter or a response signal has not been received from the low voltage DC-DC converter.

8. The system as set forth in claim 6, wherein the vehicle controller is configured to control torque such that torque of the driving motor linearly decreases from the maximum torque to zero torque in order to enable traveling speed of a vehicle to reach the restricted vehicle speed.

* * * * *